United States Patent
Isokawa

(10) Patent No.: US 11,276,421 B2
(45) Date of Patent: Mar. 15, 2022

(54) ENERGY-ASSISTED MAGNETIC RECORDING DEVICE

(71) Applicants: Kabushiki Kaisha Toshiba, Tokyo (JP); Toshiba Electronic Devices & Storage Corporation, Tokyo (JP)

(72) Inventor: Hiroshi Isokawa, Yokohama Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/010,025

(22) Filed: Sep. 2, 2020

(65) Prior Publication Data

US 2021/0201940 A1  Jul. 1, 2021

(30) Foreign Application Priority Data

Dec. 25, 2019  (JP) .............................. JP2019-234851

(51) Int. Cl.
| | | |
|---|---|---|
| G11B 11/105 | (2006.01) | |
| G11B 5/012 | (2006.01) | |
| G11B 5/127 | (2006.01) | |
| G11B 5/02 | (2006.01) | |
| G11B 5/00 | (2006.01) | |
| G11B 7/126 | (2012.01) | |

(52) U.S. Cl.
CPC ............. *G11B 5/012* (2013.01); *G11B 5/02* (2013.01); *G11B 5/1278* (2013.01); *G11B 7/126* (2013.01); *G11B 2005/0021* (2013.01); *G11B 2005/0024* (2013.01)

(58) Field of Classification Search
None
See application file for complete search history.

(56) References Cited

U.S. PATENT DOCUMENTS

| | | | | |
|---|---|---|---|---|
| 8,810,954 | B1 * | 8/2014 | Taguchi | G11B 5/1278 360/75 |
| 9,042,208 | B1 * | 5/2015 | Knigge | G11B 5/607 369/13.33 |
| 9,099,103 | B1 * | 8/2015 | Krichevsky | G11B 11/10595 |
| 9,454,991 | B2 | 9/2016 | Sutardja | |
| 9,842,047 | B2 | 12/2017 | Gao et al. | |
| 10,037,769 | B1 * | 7/2018 | Tomoda | G11B 5/012 |
| 10,957,343 | B1 * | 3/2021 | Tomoda | G11B 5/012 |
| 10,957,345 | B2 * | 3/2021 | Tomoda | G11B 5/1278 |
| 10,984,820 | B2 * | 4/2021 | Isokawa | G11B 5/4886 |

(Continued)

FOREIGN PATENT DOCUMENTS

JP  2014-86116 A  5/2014

*Primary Examiner* — Tan X Dinh
(74) *Attorney, Agent, or Firm* — Allen & Overy LLP

(57) ABSTRACT

According to one embodiment, a magnetic disk device includes a disk having a first area, and a second area to which data is temporary written, a head including a write head which writes data to the disk, and an assisting element which generates energy which improves write performance of the write head, and a controller which writes data to the first area by supplying energy having a first value to the assisting element, and writes data to the second area by supplying energy having a second value different from the first value to the assisting element.

13 Claims, 8 Drawing Sheets

(56) References Cited

U.S. PATENT DOCUMENTS

| | | | |
|---|---|---|---|
| 2014/0122793 A1 | 5/2014 | Inoue | |
| 2014/0285923 A1* | 9/2014 | Aoki | G11B 7/00 360/97.12 |
| 2016/0148635 A1* | 5/2016 | Zhu | G11B 7/1263 369/13.26 |
| 2016/0148643 A1* | 5/2016 | Gao | G11B 20/1217 369/13.35 |
| 2017/0092304 A1* | 3/2017 | Koizumi | G11B 5/3173 |
| 2021/0065739 A1* | 3/2021 | Atsumi | G11B 5/012 |
| 2021/0065744 A1* | 3/2021 | Ito | G11B 5/3967 |
| 2021/0090605 A1* | 3/2021 | Suzuki | G11B 5/187 |

* cited by examiner

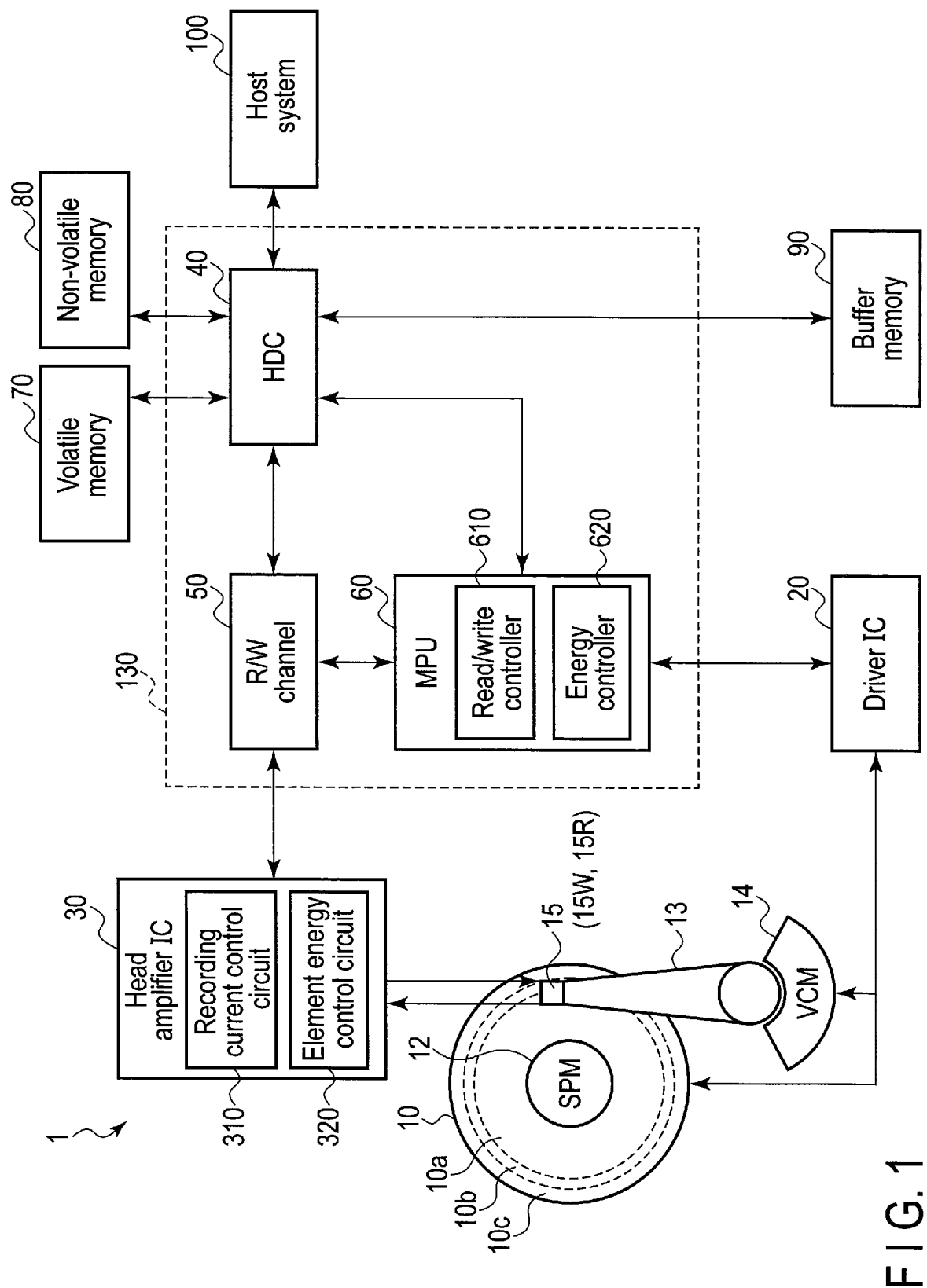
F I G. 1

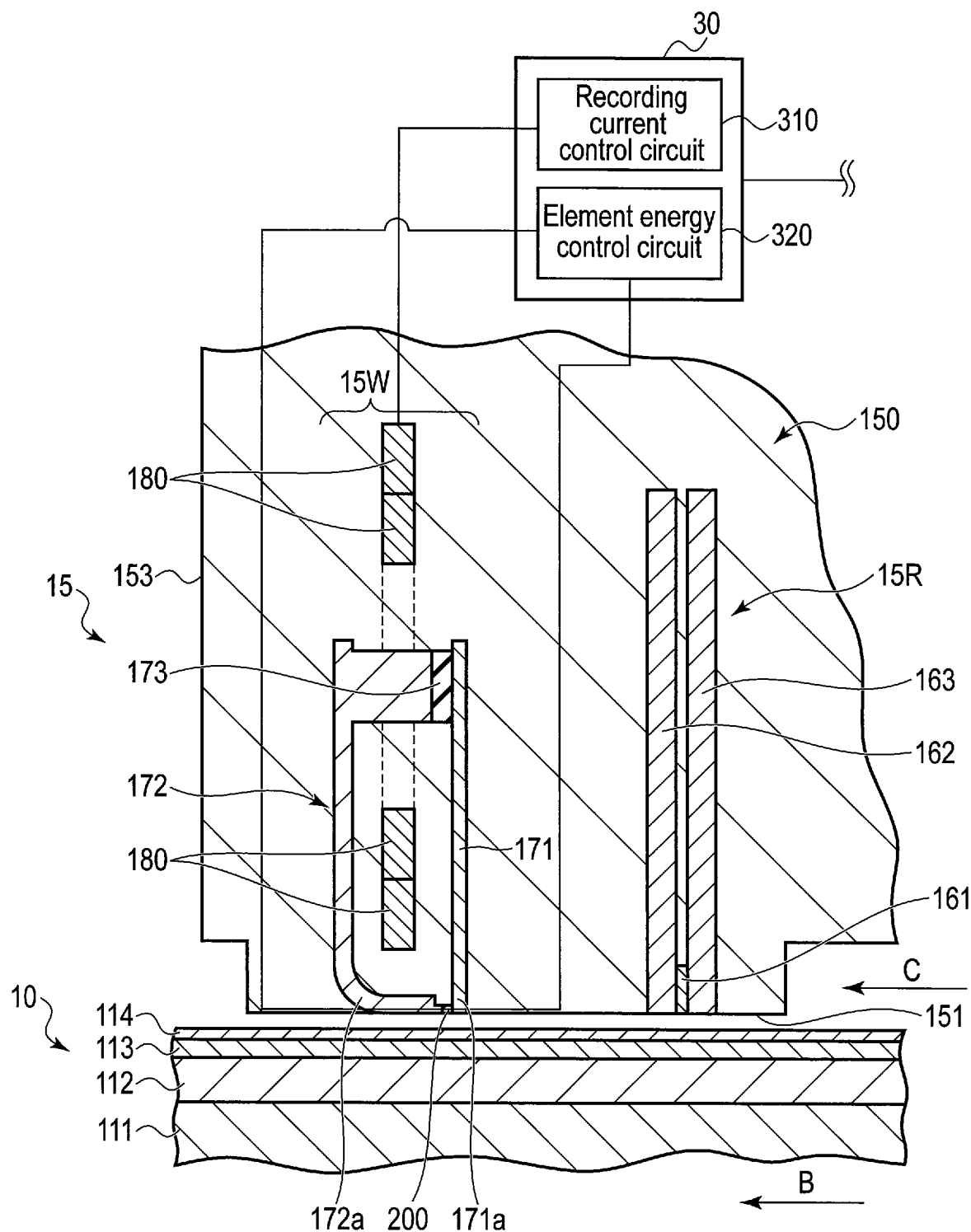
F I G. 3

ENERGY-ASSISTED MAGNETIC RECORDING DEVICE

CROSS-REFERENCE TO RELATED APPLICATIONS

This application is based upon and claims the benefit of priority from Japanese Patent Application No. 2019-234851, filed Dec. 25, 2019, the entire contents of which are incorporated herein by reference.

FIELD

Embodiments described herein relate generally to a magnetic disk device and a write processing method.

BACKGROUND

To realize high recording density and high recording capacity of a magnetic disk device, a microwave assisted magnetic recording (MAMR), a thermally assisted magnetic recording (TAMR) and the like have been developed. The microwave assisted magnetic recording is a technology which uses a magnetic head including a recording magnetic pole (main magnetic pole) and a high-frequency oscillator generating a recording magnetic field when subjected to and excited by a recording current, and reduces, by applying a high-frequency magnetic field generated by energizing the high-frequency oscillator to a disk, the coercivity of the part of the disk subjected to the high-frequency magnetic field. The thermally assisted magnetic recording is a technology which uses a magnetic head including a light-emitting element emitting light toward a disk, and reduces, by emitting light from the end of the light-emitting element to a disk and locally heating the disk, the coercivity of the part of the disk heated.

BRIEF DESCRIPTION OF THE DRAWINGS

FIG. 1 is a block diagram showing the configuration of a magnetic disk device according to the first embodiment.

FIG. 3 is an enlarged cross-sectional view showing an example of the disk and the head according to the first embodiment.

DETAILED DESCRIPTION

Figure 2:
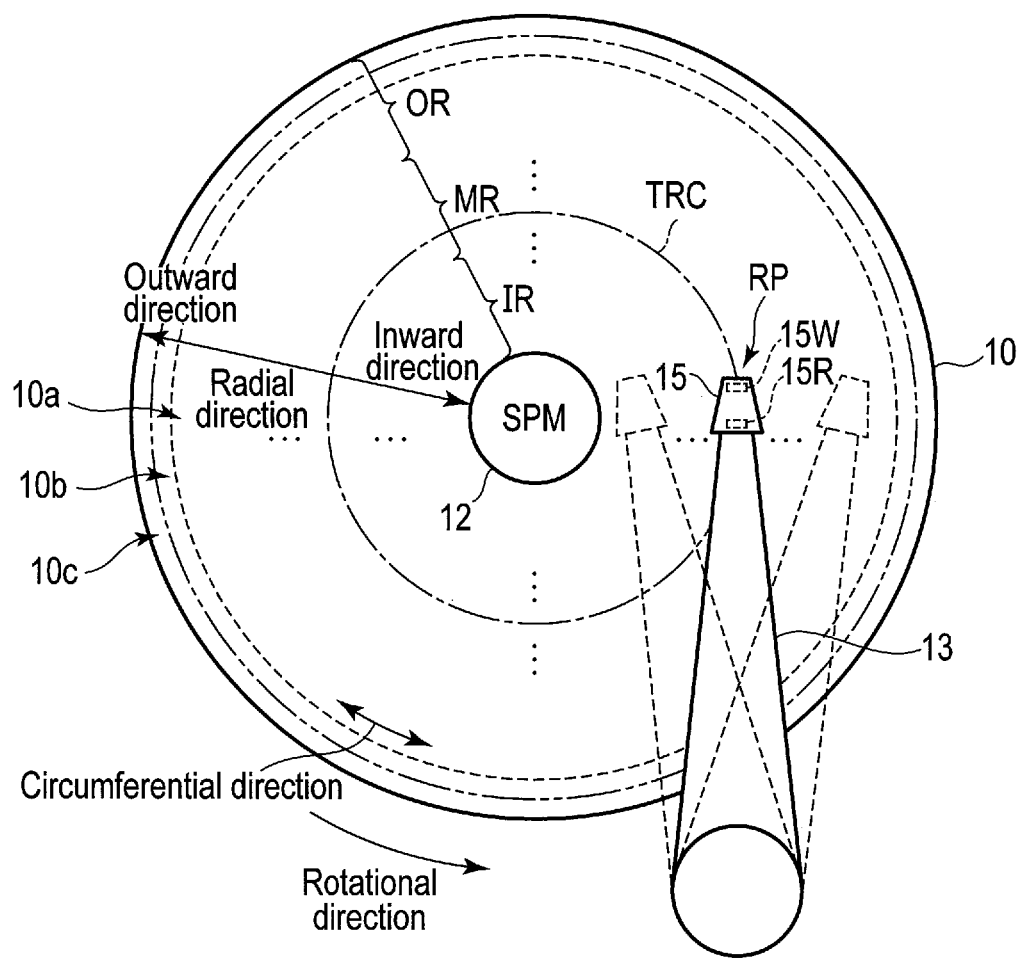
FIG. 2 is a schematic diagram showing an example of the arrangement of a head with respect to a disk according to the first embodiment.

In general, according to one embodiment, a magnetic disk device comprises a disk having a first area, and a second area to which data is temporary written; a head including a write head which writes data to the disk, and an assisting element which generates energy which improves write performance of the write head; and a controller which writes data to the first area by supplying energy having a first value to the assisting element, and writes data to the second area by supplying energy having a second value different from the first value to the assisting element.

Embodiments will be described hereinafter with reference to the accompanying drawings. Note that the drawings are merely examples and are not intended to limit the scope of the invention.

First Embodiment

FIG. 1 is a block diagram showing the configuration of a magnetic disk device 1 according to the first embodiment.

The magnetic disk device 1 includes a head disk assembly (HDA) which will be described later, a driver IC 20, a head amplifier integrated circuit (hereinafter referred to as a head amplifier IC or a preamplifier) 30, a volatile memory 70, a nonvolatile memory 80, a buffer memory (buffer) 90, and a system controller 130 which is a single-chip integrated circuit. In addition, the magnetic disk device 1 is connected to a host system (hereinafter referred to simply as a host) 100.

The HDA includes a magnetic disk (hereinafter referred to as a disk) 10, a spindle motor (hereinafter referred to as an SPM) 12, an arm 13 on which a head 15 is mounted, and a voice coil motor (hereinafter referred to as a VCM) 14. The disk 10 is attached to the SPM 12, and rotates by the driving of the SPM 12. The arm 13 and the VCM 14 constitute an actuator. The actuator executes movement control to move the head 15 mounted on the arm 13 to a particular position of the disk 10 by the driving of the VCM 14. Two or more disks 10 and two or more heads 15 may be disposed. On the disk 10, the following areas are allocated in its area to which data can be written. That is, a user data area 10a which can be used by the user, a media cache (referred to also as a media cache area or a save area) 10b where data (or a command) transferred from the host or the like is temporarily saved or recorded before it is written to a particular area of the user data area 10a, and a system area 10c where information necessary for system management is written are allocated. For example, the save area (for example, the media cache 10b) corresponds to a cache area which eliminates a mismatch between a process speed at which data is processed in a particular part or a transfer speed at which data is transferred from a particular area to the disk 10 and a write speed at which data is written to the disk 10, etc. Note that the save area may include the system area 10c. In addition, an area of the disk 10 other than the media cache 10b and the system area 10c which temporarily saves or records data may be used as the save area. A direction from the inner circumference toward the outer circumference of the disk 10 or a direction from the outer circumference toward the inner circumference of the disk 10 will be hereinafter referred to as a radial direction. With regard to the radial direction, a direction from the inner circumference toward the outer circumference will be referred to as an outward direction (outside), and a direction from the outer circumference to the inner circumference will be referred to as an inward direction (inside). A direction orthogonal to the radial direction of the disk 10 will be referred to as a circumferential direction. The circumferential direction corresponds to a direction along the circumference of the disk 10. In addition, a particular position in the radial direction of the disk 10 will be referred to also as a radial position, and a particular position in the circumferential direction of the disk 10 will be referred to also as a circumferential position. The radial position and the circumferential position will also be referred to collectively and simply as positions. Note that a "track" will be used as one area of a plurality of areas separated in the radial direction of the disk 10, a path of the head 15 at a particular radial position, data extending in the circumferential direction of the disk 10, data of one circumference written to a track at a particular radial position, data written to a track, and various other meanings. A "sector" will be used as one area of a plurality of areas separated in the circumferential direction of a track, data written to a particular position of the disk 10, data written to a sector, and various other meanings. A "track written to the disk 10" will be referred to also as a "write track" and a "track read from the disk 10" will be referred to also as a "read track". The "write track" will also be referred to simply as a "track", the "read track" will also be referred to simply as a "track", or the "write track" and the "read track" will also be referred to collectively as "tracks". A "width in the radial direction of the track" will be referred to also as a "track width". A "width in the radial direction of the write track" will be referred to also as a "write track width" and a "width in the radial direction of the read track" will be referred to also as a "read track width". The "write track width" and the "read track width" will also be referred to collectively and simply as "track widths". A "path passing through the central position of the track width of a particular track" will be referred to as a "track center". A "path passing through the central position of the write track width of a particular write track" will be referred to also as a "write track center", and a "path passing through the central position of the read track width of a particular read track" will be referred to also as a "read track center". The "write track center" and the "read track center" will also be referred to collectively and simply as "track centers".

The head 15 includes a slider as a main body, and a write head 15W and a read head 15R mounted on the slider. The write head 15W writes data to the disk 10. The read head 15R reads data written on the disk 10. Note that the "write head 15W" will also be referred to simply as a "head 15", the "read head 15R" will also be referred to simply as a "head 15", and the "write head 15W" and the "read head 15R" will also be referred to collectively as "heads 15". A "central part of the head 15" will be referred to also as a "head 15", a "central part of the write head 15W" will be referred to also as a "write head 15", or a "central part of the read head 15R" will be referred to also as a "read head 15R". The "central part of the write head 15W" will also be referred to simply as a "head 15" or the "central part of the read head 15R" will also be referred to simply as a "head 15". To "position the central part of the head 15 at the track center of a particular track" will be expressed also as to "position the head 15 on a particular track", to "dispose the head 15 on a particular track", to "locate the head 15 on a particular track" and the like.

FIG. 2 is a schematic diagram showing an example of the arrangement of the head 15 with respect to the disk 10 according to the present embodiment. As shown in FIG. 2, with regard to the circumferential direction, a direction in which the disk 10 rotates will be referred to as a rotational direction. Note that the rotational direction is shown as a counterclockwise direction in the example shown in FIG. 2 but may be an opposite direction (clockwise direction). In FIG. 2, the disk 10 is divided into an inner circumferential region IR located in the inward direction, an outer circumferential region OR located in the outward direction, and a middle circumferential region MR located between the inner circumferential region IR and the outer circumferential region OR. FIG. 2 shows the media cache 10b. In FIG. 2, the media cache 10b and the system area 10c are located in the outer circumferential region OR. In the example shown in FIG. 2, the system area 10c is located at the outermost circumference of the disk 10. The media cache 10b is arranged adjacently in the inward direction of the system area 10c. In other words, the media cache 10b is arranged adjacently to the system area 10c in the outer circumferential region OR. Here, "adjacent" certainly includes a case where items of data, objects, areas, spaces and the like are arranged next to each other and are in contact with each other, but also includes a case where these are arranged at particular intervals. Note that, for example, the media cache 10b may not be arranged at the outermost circumference of the disk 10. The media cache 10b may be located in the inner circumferential region IR or the middle circumferential region MR. For example, the media cache 10b may be located at the innermost circumference of the disk 10. In addition, the media cache 10b may be arranged in a plurality of areas arranged at intervals in the radial direction on the disk 10. For example, the media cache 10b may be distributed in the outer circumferential region OR, may be distributed in the middle circumferential region MR, or may be distributed in the inner circumferential region IR. Furthermore, for example, the media cache 10b may be distributed in the outer circumferential region OR, the middle circumferential region MR and the inner circumferential region IR. FIG. 2 shows a radial position RP. In the example shown in FIG. 2, the radial position RP is included in the middle circumferential region MR. FIG. 2 shows a track center TRC. The track center TRC is located concentrically with the disk 10, for example. For example, the track center TRC is located like a perfect circle. Note that the track center TRC is not necessarily located like a circle and may be located like a wave extending in the circumferential direction while fluctuating in the radial direction. In FIG. 2, the radial position RP corresponds to the track center TRC.

The head 15 is positioned at the radial position RP, and writes data to a particular track along the track center TRC by the write head 15W or reads data written on a particular track along the track center TRC by the read head 15R.

FIG. 3 is an enlarged cross-sectional view showing an example of the disk 10 and the head 15 according to the first embodiment. In FIG. 3, the rotational direction B of the disk 10 and the direction of an airflow C coincide with each other. A direction from the head 15 toward the disk 10 will be hereinafter referred to as a downward direction or simply as below, and a direction from the disk 10 toward the head 15 will be hereinafter referred to as an upward direction or simply as above. When expressed as "another layer above a particular layer" and "another layer below a particular layer", the other layer may be in contact with the particular layer or may be located away from the particular layer.

In the example shown in FIG. 3, a substrate 111, a soft magnetic layer 112, a magnetic recording layer 113 and a protective layer 114 are sequentially stacked on the disk 10. The substrate 111 is formed of a disk-shaped nonmagnetic material. The soft magnetic layer 112 is located on the substrate 111. The soft magnetic layer 112 is formed of a material exhibiting soft magnetic properties. The magnetic recording layer 113 is located on the soft magnetic layer 112. The magnetic recording layer 113 has magnetic anisotropy in a direction perpendicular to a surface of the disk 10 (a surface of the soft magnetic recording layer 113 or a surface of the protective layer 114). The protective layer 114 is located on the magnetic recording layer 113.

In the example shown in FIG. 3, the head 15 includes a slider 150. The slider 150 is formed of, for example, a sintered material of alumina and titanium carbide (that is, AlTiC). The slider 150 has a disk-facing surface (air bearing surface (ABS)) 151 facing the surface of the disk 10, for example, the protective layer 114, and a trailing end 153 located on an outflow side of the airflow C. The read head 15R and the write head 15W are partly exposed at the disk-facing surface 151.

The read head 15R is formed of a magnetic film 161, a shield film 162 and a shield film 163. The magnetic film 161 is located between the shield film 162 and the shield film 163 and produces a magnetoresistive effect. The shield film 162 is located on a trailing end 153 side with respect to the magnetic film 161. The shield film 163 faces the shield film 162. Lower ends of the magnetic film 161, the shield film 162 and the shield film 163 are exposed at the disk-facing surface 151.

The write head 15W is disposed on a trailing end 153 side of the slider 150 with respect to the read head 15R. The write head 15W includes a main magnetic pole 171, a trailing shield (a write shield) 172, an insulator 173, a recording coil 180 disposed to wind around a magnetic circuit including the main magnetic pole 171 and the write shield 172 to supply a magnetic flux to the main magnetic pole 171, and a magnetic flux controller (an assisting element), for example, a spin torque oscillator (STO) 200.

The main magnetic pole 171 is formed of a soft magnetic material having high saturation magnetic flux density. To magnetize the magnetic recording layer 113 of the disk 10, the main magnetic pole 171 generates a recording magnetic field in a direction perpendicular to the surface of the disk 10. In the illustrated example, the main magnetic pole 171 extends substantially perpendicularly to the disk-facing surface 151. A lower surface of an end 171a on a disk-facing surface 151 side of the main magnetic pole 171 is exposed at the disk-facing surface 151. The end 171a of the main magnetic pole 171 is tapered toward the disk-facing surface 151 and is formed in the shape of a pillar narrower than the other part. The width in a cross-track direction of the end 171a of the main magnetic pole 171 substantially corresponds to the track width of the write track. The cross-track direction is, for example, a direction along the radial direction.

The write shield 172 is formed of a soft magnetic material having high saturation magnetic flux density. The write shield 172 is disposed to efficiently close the magnetic circuit via the soft magnetic layer 112 directly below the main magnetic pole 171. The write shield 172 is located on a trailing end 153 side with respect to the main magnetic pole 171. The write shield 172 is connected to the main magnetic pole 171 via the insulator 173. The main magnetic pole 171 and the write shield 172 are electrically insulated from each other and form the magnetic circuit. The write shield 172 is substantially L-shaped, and has an end 172a facing the end 171a of the main magnetic pole 171 across a write gap on a disk-facing surface 151 side. A lower surface of the end 172a is exposed at the disk-facing surface 151 of the slider 150.

The recording coil 180 is disposed to wind around the magnetic circuit including the main magnetic pole 171 and the write shield 172 to supply a magnetic flux to the main magnetic pole 171. The recording coil 180 is disposed, for example, between the main magnetic pole 171 and the write shield 172. When a current having a particular magnitude (referred to as a write current or a recording current) is applied to the recording coil 180, a recording magnetic field is generated in the main magnetic pole 171 and the write shield 172. As a result, the main magnetic pole 171 and the write shield 172 are magnetized. By a magnetic flux flowing through these magnetized main magnetic pole 171 and write shield 172, the magnetization direction of a recording bit of the magnetic recording layer 113 of the disk 10 is changed, and a magnetization pattern corresponding to the recording current is recorded on the disk 10.

The assisting element, for example, the spin torque oscillator (STO) 200 is disposed between the end 171a of the main magnetic pole 171 and the end 172a of the write shield 172. In other words, the spin torque oscillator 200 is disposed in the write gap. The STO 200 has, for example, a structure in which an underlayer formed of a nonmagnetic conductive layer, a spin injection layer, an intermediate layer, an oscillation layer and a gap layer formed of a nonmagnetic conductive layer are sequentially stacked from an end 171a side of the main magnetic pole 171 to an end 172a side of the write shield 172.

The assisting element, for example, the STO 200 generates an energy which improves the write performance of the write head 15W on the disk 10 toward the disk 10. When a particular energy (hereinafter referred to also as an element energy), for example, a particular current (hereinafter referred to as a driving current or an assisting current) or a particular voltage (hereinafter referred to as a driving voltage or an assisting voltage) is applied to the STO 200, a gap magnetic field is generated in the write gap, and magnetization is uniformly rotated (precession of spin occurs), and a high-frequency magnetic field having a sufficiently high frequency as compared to the frequency of a recording signal (a microwave) is generated toward the disk 10. The STO 200 reduces the coercivity of the magnetic recording layer 113 by applying the high-frequency magnetic field to the magnetic recording layer 113 of the disk 10. When the precession of spin occurs very much in the spin torque oscillator 200, the magnetic permeability of the STO 200 is substantially as low as the magnetic permeability of air. Therefore, the magnetic flux from the main magnetic pole 171 flows more toward the disk 10 than the write gap (STO 200). On the other hand, when the precession of spin does not occur at all or does not occur as much as usual in the STO 200, the magnetic permeability of the spin torque oscillator 200 is greater than the magnetic permeability of air. Therefore, the magnetic flux from the main magnetic pole 171 flows more toward the write gap (STO 200) than the disk 10. The write processing of writing data by supplying the element energy, for example, the driving current (referred to also as the assisting current) or the driving voltage (referred to also as the assisting voltage) to the assisting element, for example, the STO 200 will be hereinafter referred to also as assisted recording or microwave assisted recording. The effect of assisting the write processing on the disk 10 will be hereinafter referred to also as an assisting effect. In addition, to "execute assisted recording" will also be referred to simply as to "write".

The driver IC 20 controls the driving of the SPM 12 and the VCM 14 according to the control of the system controller 130 (more specifically, an MPU 60 which will be described later).

The head amplifier IC (preamplifier) 30 includes a read amplifier which is not shown in the drawing, a write driver, for example, a recording current control circuit 310, an element energy control circuit 320 and the like. The read amplifier amplifies a read signal read from the disk 10 and outputs it to the system controller 130 (more specifically, a read/write (R/W) channel 50 which will be described later). The recording current control circuit 310 is electrically connected to the recording coil 180 and supplies a recording current according to write data output from the R/W channel 50 to the recording coil 180. The data written to the disk 10 will be hereinafter referred to also as write data, and the data read from the disk 10 will be hereinafter referred to also as read data. For example, the recording current control circuit 310 supplies the recording current to the recording coil 180 according to the control of the system controller 130 (MPU 60). The element energy control circuit 320 is electrically connected to the assisting element, for example, the spin torque oscillator 200, and applies a particular element energy, for example, a particular assisting current or a particular assisting voltage to the spin torque oscillator 200 according to the control of the system controller 130, for example, the MPU 60.

The volatile memory 70 is a semiconductor memory which loses saved data when power supply is cut off. The nonvolatile memory 70 stores data required for processing in each unit of the magnetic disk device 1, etc. The volatile memory 70 is, for example, a dynamic random access memory (DRAM) or a synchronous dynamic random access memory (SDRAM).

The nonvolatile memory 80 is a semiconductor memory which records saved data even when power supply is cut off. The nonvolatile memory 80 is, for example, a NOR or NAND flash read only memory (FROM).

The buffer memory 90 is a semiconductor memory which temporarily records data transmitted between the magnetic disk device 1 and the host 100, etc. Note that the buffer memory 90 may be integrally formed with the volatile memory 70. The buffer memory 90 is, for example, a DRAM, a static random access memory (SRAM), an SDRAM, a ferroelectric random access memory (FeRAM), a magnetoresistive random access memory (MRAM) or the like.

The system controller (controller) 130 is realized by, for example, a large-scale integrated circuit (LSI) called a system-on-a-chip (SoC) in which a plurality of elements are integrated on a single chip. The system controller 130 includes a hard disk controller (HDC) 40, a read/write (R/W) channel 50 and a microprocessor (MPU) 60. The HDC 40, the R/W channel 50 and the MPU 60 are electrically connected to one another. The system controller 130 is electrically connected to, for example, the driver IC 20, the head amplifier IC 30, the volatile memory 70, the nonvolatile memory 80, the buffer memory 90, the host system 100 and the like.

The HDC 40 controls data transfer between the host 100 and the R/W channel 50 according to a command from the MPU 60 which will be described later. The HDC 40 is electrically connected to, for example, the volatile memory 70, the nonvolatile memory 80, the buffer memory 90 and the like.

The R/W channel 50 executes signal processing of read data and write data according to a command from the MPU 60. The R/W channel 50 is electrically connected to, for example, the head amplifier IC 30 and the like. The R/W channel 50 has a circuit or function to modulate write data. In addition, the R/W channel 50 has a circuit or function to measure the signal quality of read data.

The MPU 60 is a main controller which controls each unit of the magnetic disk device 1. The MPU 60 controls the VCM 14 via the driver IC 20 and executes positioning of the head 15. The MPU 60 controls operation of writing data to the disk 10 and selects a save designation for write data transferred from the host 100. In addition, the MPU 60 controls operation of reading data from the disk 10 and controls processing of read data transferred from the disk 10 to the host 100. The MPU 60 is connected to each unit of the magnetic disk device 1. The MPU 60 is electrically connected to, for example, the driver IC 20, the HDC 40, the R/W channel 50 and the like.

The MPU 60 includes a read/write controller 610 and an energy controller 620. The MPU 60 executes processing of each unit, for example, each of the read/write controller 610, the energy controller 620 and the like on firmware. Note that the MPU 60 may include each unit, for example, each of the read/write controller 610, the energy controller 620 and the like as a circuit.

The read/write controller 610 controls write processing and read processing of data according to a command, etc., from the host 100, etc. When receiving a command (hereinafter referred to also as a write command) which instructs to write data (hereinafter referred to also as designated data) designated by the host 100, etc., to a particular area (hereinafter referred to also as a write area) designated by the host 100, etc., the read/write controller 610 executes write processing of writing the designated data to the write area. Note that the "designated data" will also be referred to simply as "data". The write area corresponds to an area different from the save area. When receiving a command (hereinafter referred to also as a read command) which instructs to read designated data from a particular area (hereinafter referred to also as a read area) designated by the host, etc., the read/write controller 610 executes read processing of reading the designated data from the read area. The read/write controller 610 executes the write processing or the read processing by controlling the VCM 14 via the driver IC 20 and positioning the head 15 at an intended position of the disk 10. For example, the read/write controller 610 writes data to the write area (executes assisted recording) by supplying the element energy, for example, the assisting current or the assisting voltage to the assisting element, for example, the STO 200. Note that the read/write controller 610 may write data to the write area without the assisting effect by not supplying the element energy, for example, the assisting current or the assisting voltage to the assisting element, for example, the STO 200.

For example, when receiving a plurality of write commands consecutively from the host 100, etc., the read/write controller 610 temporarily writes (saves) a plurality of items of designated data which are designated respectively by the write commands to a save area, and sequentially reads the items of designated data which are temporarily written (saved) in the save area and sequentially writes the items of designated data to the write area. For example, the read/write controller 610 temporarily writes the items of designated data which are designated respectively by the write commands transmitted consecutively from the host 100, etc., to the media cache 10*b*, sequentially reads the items of designated data written in the media cache 10*b* from the media cache 10*b*, and sequentially writes the items of designated data read from the media cache 10b to the write area in the user data area 10b. The "processing of temporarily writing data to the save area, and reading the data temporarily written in the save area and writing the data to the write area" will also be referred to simply as "write processing".

The energy controller 620 controls (or adjusts) the energy supplied to the head 15. The energy controller 620 controls (or adjusts) the recording current supplied (or applied) to the recording coil 180 and the element energy supplied (or applied) to the assisting element. For example, the energy controller 620 controls the assisting current or the assisting voltage supplied (applied) to the STO 200. In the write processing, the energy controller 620 changes the element energy supplied to the assisting element via the element energy control circuit 320. For example, in the write processing, the energy controller 620 changes the assisting current or the assisting voltage supplied to the STO 200 via the element energy control circuit 320. In the write processing, the energy controller 620 sets the element energy (hereinafter referred to also as a temporary save energy) supplied to the assisting element when data is temporarily written to the save area (hereinafter referred to also as temporary save processing) and the element energy (hereinafter referred to also as a normal energy) supplied to the assisting element when data is written to the write area (hereinafter referred to also as normal write processing) to different values. In other words, the energy controller 620 writes data to the save area (executes assisted recording) while supplying (or in a state of supplying) the temporary save energy different from the normal energy to the assisting element in the temporary save processing. For example, in the write processing, the energy controller 620 sets the assisting current (hereinafter referred to also as a temporary save current) or the assisting voltage (hereinafter referred to also as a temporary save voltage) supplied to the STO 200 in the temporary save processing and the assisting current (hereinafter referred to also as a normal write current) or the assisting voltage (hereinafter referred to also as a normal write voltage) supplied to the STO 200 in the normal write processing to different values. In other words, the energy controller 620 writes data to the save area (executes assisted recording) by supplying the temporary save current or the temporary save voltage different from the normal write current or the normal write voltage to the STO 200 in the temporary save processing. Note that the "temporary save energy" includes the "temporary save current" and the "temporary save voltage". In addition, the "normal energy" includes the "normal write current" and the "normal write voltage".

In the write processing, the energy controller 620 sets the value of the temporary save energy supplied to the assisting element (hereinafter referred to also as a temporary save energy value) to less than the value of the normal energy (hereinafter referred to also as a normal energy value). In other words, the energy controller 620 writes data to the save area (executes assisted recording) by supplying the temporary save energy having the temporary save energy value less than the normal energy value to the assisting element. For example, in the write processing, the energy controller 620 sets the current value of the temporary save current (hereinafter referred to also as a temporary save current value) or the voltage value of the temporary save voltage (hereinafter referred to also as a temporary save voltage value) supplied to the STO 200 to less than the current value of the normal write current (hereinafter referred to also as a normal write current value) or the voltage value of the normal write voltage (hereinafter referred to also as a normal write voltage value). In other words, the energy control unit 620 writes data to the save area (executes assisted recording) by supplying the temporary save current having the temporary save current value less than the normal write current value or the temporary save voltage having the temporary save voltage value less than the normal write voltage value to the STO 200. Note that, in the write processing, the energy controller 620 may set the temporary save energy value to less than or equal to 10% of the normal energy value. For example, the energy controller 620 may set the temporary save current value or the temporary save voltage value to less than or equal to 10% of the normal current value or the normal voltage value. In addition, in the write processing, the energy controller 620 may set the temporary save energy value to zero (0). For example, in the write processing, the energy controller 620 may set the temporary save current value to zero (0) amperes (A) or the temporary save voltage value to zero (0) volts (V).

In the write processing, the energy controller 620 sets the normal energy value to greater than the temporary save energy value. In other words, the energy controller 620 writes data to the write area (executes assisted recording) by supplying the normal energy having the normal energy value greater than the temporary save energy value to the assisting element. For example, in the write processing, the energy controller 620 sets the normal write current value or the normal write voltage value supplied to the STO 200 to greater than the temporary save current value or the temporary save voltage value. In other words, the energy controller 620 writes data to the write area (executes assisted recording) by supplying the normal write current having the normal write current value greater than the temporary save current value or the normal write voltage having the normal write voltage greater than the temporary save voltage value to the STO 200.

The energy controller 620 may record the temporary save energy value (for example, the temporary save current value and the temporary save voltage value) and the normal energy value (for example, the normal write current value and the normal write voltage value) as a table on a predetermine save area, for example, the system area 10c of the disk 10, the nonvolatile memory 80 or the like. In addition, the energy controller 620 may calculate the temporary save energy value (for example, the temporary save current value and the temporary save voltage value) based on the normal energy value (for example, the normal write current and the normal write voltage). For example, the energy controller 620 may calculate the temporary save energy value (for example, the temporary save current value and the temporary save voltage value) by multiplying the normal energy value (for example, the normal write current and the normal write voltage) by a factor. Note that the energy controller 620 may have a value of element energy (hereinafter referred to also as an element energy value) which is different from the temporary save energy value (for example, the temporary save current value and the tempo-rary save voltage value) and the normal energy value (for example, the normal write current value and the normal write voltage value). The element energy value includes, for example, the temporary save energy value (for example, the temporary save current value and the temporary save voltage value) and the normal energy value (for example, the normal write current value and the normal write voltage value). In addition, the energy controller 620 may have a plurality of temporary save energy values according to the save area or a plurality of normal energy values according to the write area.

The energy controller 620 sets the track recording density of data written to the save area to a value different from the track recording density of data written to the write area by setting the temporary save energy value, for example, the temporary save current value or the temporary save voltage value to a value different from the normal energy value, for example, the normal write current value or the normal write voltage value. The energy controller 620 sets the track recording density of data written to the save area, for example, the media cache 10*b* (hereinafter referred to also as the track recording density in the temporary save processing) to less than the track recording density of data written to the write area, for example, a particular area of the user data area 10*a* (hereinafter referred to also as the track recording density in the normal write processing) by setting the temporary save energy value, for example, the temporary save current value or the temporary save voltage value to less than the normal energy value, for example, the normal write current value or the normal write voltage value. In other words, the energy controller 620 sets the track recording density in the temporary save processing to greater than the track recording density in the normal writing processing by setting the temporary save energy value, for example, the temporary save current value or the temporary save voltage value to greater than the normal energy value, for example, the normal write current value or the normal write voltage value.

In the temporary save processing, the energy controller 620 adjusts to the temporary save energy corresponding to the track recording density in the temporary save processing greater than a track recording density corresponding to an acceptable signal quality (hereinafter referred to as an acceptable value). For example, the energy controller 620 may record the track recording density in the temporary save processing and the track recording density in the normal write processing as a table on a particular recording area, for example, the system area 10*c* of the disk 10, the nonvolatile memory 80 or the like. For example, the energy controller 620 calculates the temporary save energy value by multiplying the normal energy value by a damping rate which changes the track recording density in the normal write processing to the track recording density in the temporary save processing. The energy controller 620 may record a table TB showing the relationship between the track recording density and the damping rate on a particular save area, for example, the system area 10*c* of the disk 10, the nonvolatile memory 80 or the like. Note that the energy controller 620 may have a track recording density of data written to a particular area of the disk 10 which is different from the track recording density in the temporary save processing and the track recording density in the normal write processing. In addition, the energy controller 620 may have a plurality of track recording densities in the temporary save processing according to the save area or may have a plurality of track recording densities in the normal write processing according to the write area.

Figure 4:
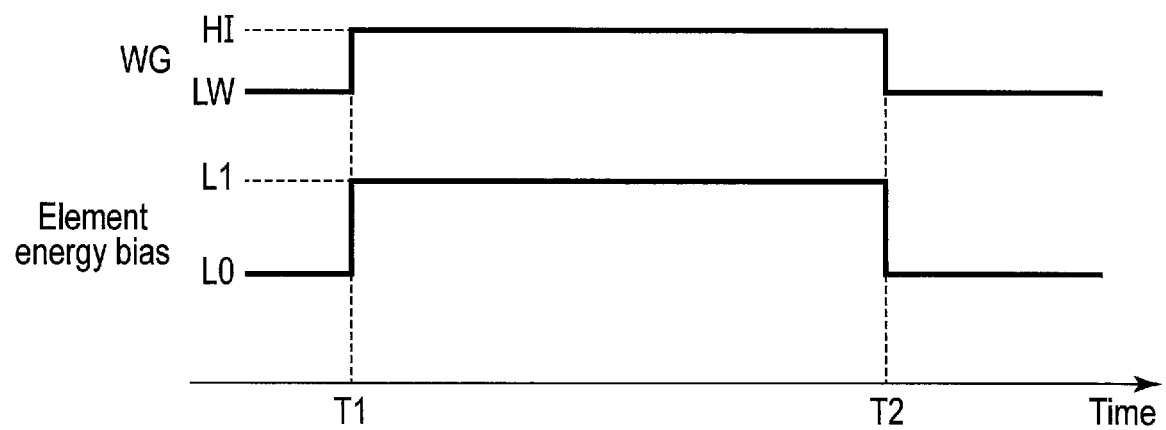
FIG. 4 is a timing chart showing an example of a write gate and an element energy bias in normal write processing according to the first embodiment.

FIG. 4 is a timing chart showing an example of a write gate WG and an element energy bias in the normal write processing according to the present embodiment. In FIG. 4, the horizontal axis represents time. On the horizontal axis of FIG. 4, time progresses toward the pointing end of the arrow. On the horizontal axis of FIG. 4, a timing T1 and a timing T2 are indicated. The timing T2 corresponds to a time later than the timing T1. FIG. 4 shows a write gate WG in the normal write processing and an element energy bias in the normal write processing. In the write gate WG in the normal write processing of FIG. 4, a signal level LW indicates that the write gate WG is in a negated (inactive, disabled or off) state and a signal level HI indicates that the write gate WG is in an asserted (active, enabled or on) state. The write gate WG changes from the signal level LW to the signal level HI at the timing T1 and changes from the signal level HI to the signal level HI at the timing T2. In the element energy bias of FIG. 4, a level L0 and a level L1 indicate the level of the element energy (for example, the magnitude of the element energy), for example, the normal energy. The level L1 is greater than the level L0. The element energy bias of FIG. 4 changes from the level L0 to the level L1 at the timing T1 and changes from the level L1 to the level L0 at the timing T2.

In the normal write processing, the energy controller 620 increases the level of the normal energy form the level L0 to the level L1 at the timing T1 at which the write gate WG is set to the signal level HI (assorted). In other words, in the normal write processing, the energy controller 620 increase the level of the normal energy from the level L0 to the level L1 at the timing T1 which is the timing of the start of the normal write processing. In the normal write processing, the energy controller 620 reduces the level of the normal energy level from the level L1 to the level L0 at the timing T2 at which the write gate WG is set to the signal level LW (negated). In other words, in the normal write processing, the energy controller 620 reduces the level of the normal energy from the level L1 to the level L0 at the timing T2 which is the timing of the end of the normal write processing.

Figure 5:
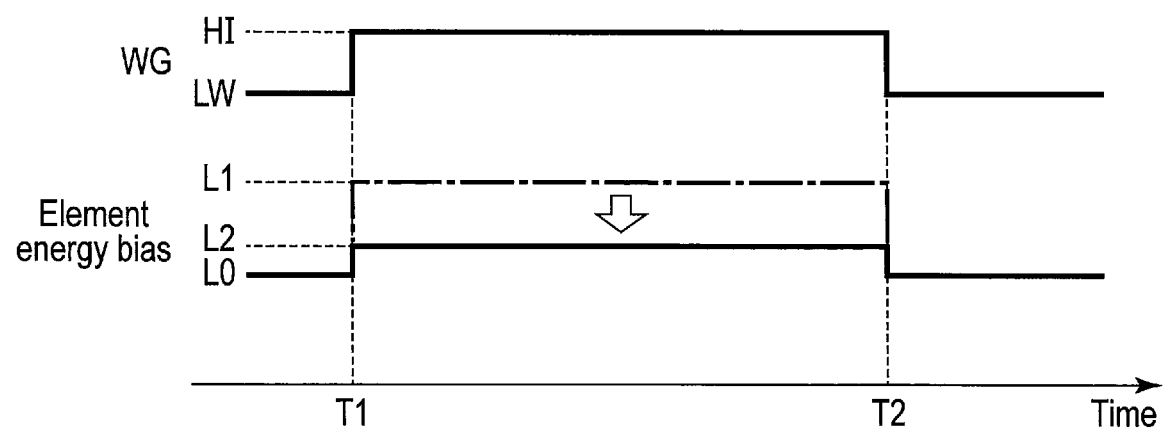
FIG. 5 is a timing chart showing an example of a write gate and an element energy bias in temporary save processing according to the first embodiment.

FIG. 5 is a timing chart showing an example of the write gate WG and the element energy bias in the temporary save processing according to the present embodiment. In FIG. 5, the horizontal axis represents time. On the horizontal axis of FIG. 5, time progresses toward the pointing end of the arrow. On the horizontal axis of FIG. 5, the timing T1 and the timing T2 are indicated. FIG. 5 shows the write gate WG in the temporary save processing and the element energy bias in the temporary save processing. In the element energy bias of FIG. 5, the level L0, the level L1 and a level L2 indicate the level (for example, the magnitude) of the element energy (for example, referred to also as the temporary save energy). The level L2 is greater than the level L0 but is less than the level L1. The element energy bias of FIG. 5 changes from the level L0 to the level L2 at the timing T1 and changes from the level L2 to the level L0 at timing T2.

In the temporary save processing, the energy controller 620 increases the level of the temporary save energy from the level L0 to the level L2 at the timing T1 when the write gate WG is set to the signal level HI (assorted). In other words, in the temporary save processing, the energy controller 620 increases the level of the temporary save energy from the level L0 to the level L2 at the timing T1 which is the timing of the start of the temporary save processing. In the temporary save write processing, the energy controller 620 reduces the level of the temporary save energy from the level L2 to the level L0 at the timing T2 when the write gate WG is set to the signal level LW (negated). In other words, in the temporary save processing, the energy controller 620 reduces the level of the temporary save energy from the level L2 to the level L0 at the timing T2 which is the timing of the end of the temporary save processing.

Figures 6, 7:
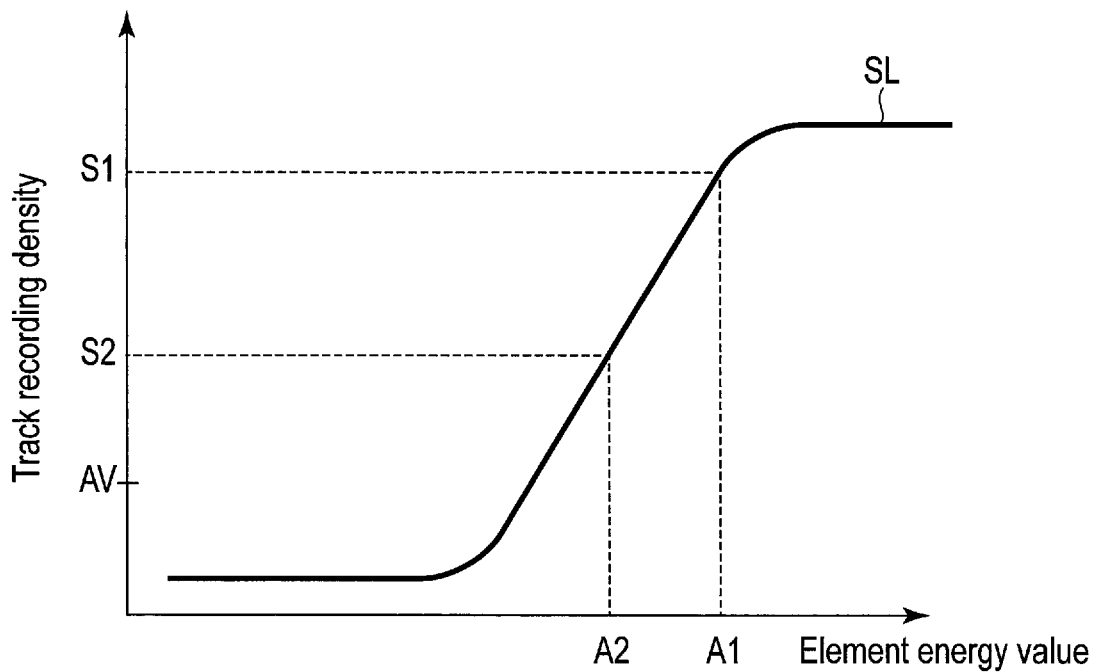
FIG. 6 is a schematic diagram showing an example of the change of a track recording density with respect to an element energy value according to the first embodiment.
FIG. 7 is a schematic diagram showing an example of the table representing the relationship between the track recording density and a damping rate according to the first embodiment.

FIG. 6 is a schematic diagram showing an example of a change SL of the track recording density with respect to the element energy value according to the present embodiment.

In FIG. 6, the vertical axis represents the track recording density, and the horizontal axis represents the element energy value. In FIG. 6, the track recording density increases toward the pointing end of the arrow of the vertical axis. On the vertical axis of FIG. 6, an acceptable value AV of the track recording density corresponding to the acceptable signal quality, a track recording density S1 in the normal write processing, and a track recording density S2 in the temporary save processing are indicated. The track recording density S2 in the temporary save processing is greater than the acceptable value AV, and the track recording density S1 in the normal write processing is greater than the track recording density S2 in the temporary save processing. In FIG. 6, the element energy increases toward the pointing end of the arrow of the horizontal axis. On the horizontal axis of FIG. 6, a normal energy value A1 and a temporary save energy value A2 are indicated. The normal energy value A1 is greater than the temporary save energy value A2. FIG. 6 shows the change SL of the track recording density with respect to the element energy value in the magnetic disk device 1 (also referred to simply as the change of the track recording density). Note that the acceptable value AV may be less than the value shown in FIG. 6 or may be greater than the value shown in FIG. 6. For example, the acceptable value AV may be less than or equal to the change of the track recording density.

In the example shown in FIG. 6, in the temporary save processing, the energy controller 620 changes from the normal energy value A1 corresponding to the track recording density S1 in the normal write processing to the temporary save energy value A2 corresponding to the track recording density S2 in the temporary save processing. In addition, in the normal write processing, the energy controller 620 changes from the temporary save energy value A2 corresponding to the track recording density S2 in the temporary save processing to the normal energy value A1 corresponding to the track recording density S1 in the normal write processing. The energy controller 620 may record data on the change SL of the track recording density shown in FIG. 6 on a particular save area, for example, the system area 10c of the disk 10, the nonvolatile memory 80 or the like.

FIG. 7 is a schematic diagram showing an example of the table TB showing the relationship between the track recording density and the damping rate according to the present embodiment. In FIG. 7, S1, S2, S3 and S4 represent the track recording density, and β1, β2 and β3 represent the damping rate. The track recording density S1 corresponds to the track recording density S1 in the normal write processing shown in FIG. 6, and the track recording density S2 corresponds to the track recording density S2 in the temporary save processing shown in FIG. 6. The track recording densities S1 to S4 are, for example, greater than or equal to the acceptable value AV. The damping rate β1 corresponds to the damping rate from the track recording density S1 to the track recording density S2, the damping rate β2 corresponds to the damping rate from the track recording density S1 to the track recording density S3, and the damping rate β3 corresponds to the damping rate from the track recording density S1 to the track recording density S4. The table TB1 includes the track recording densities S1 to S4 and the damping rates β1 to β3.

The energy controller 620 calculates the temporary save energy value by multiplying the normal energy value by a damping rate corresponding to a particular track density for each particular area of the disk 10 or for each disk 10 with reference to the table TB. In the example shown in FIGS. 6 and 7, in the temporary save processing, the energy controller 620 calculates the temporary energy value A2 by multiplying the normal energy value A1 by the damping rate β1 (=A1×β1). Note that, in the temporary save processing, the energy controller 620 may calculate the temporary save energy by multiplying the normal energy value A1 by the damping rate β2 or may calculate the temporary save energy by multiplying the normal energy value A1 by the damping rate β3. The energy controller 620 may record the table TB shown in FIG. 7 on a particular save area, for example, the system area 10c of the disk 10, the nonvolatile memory 80 or the like.

Figure 8:
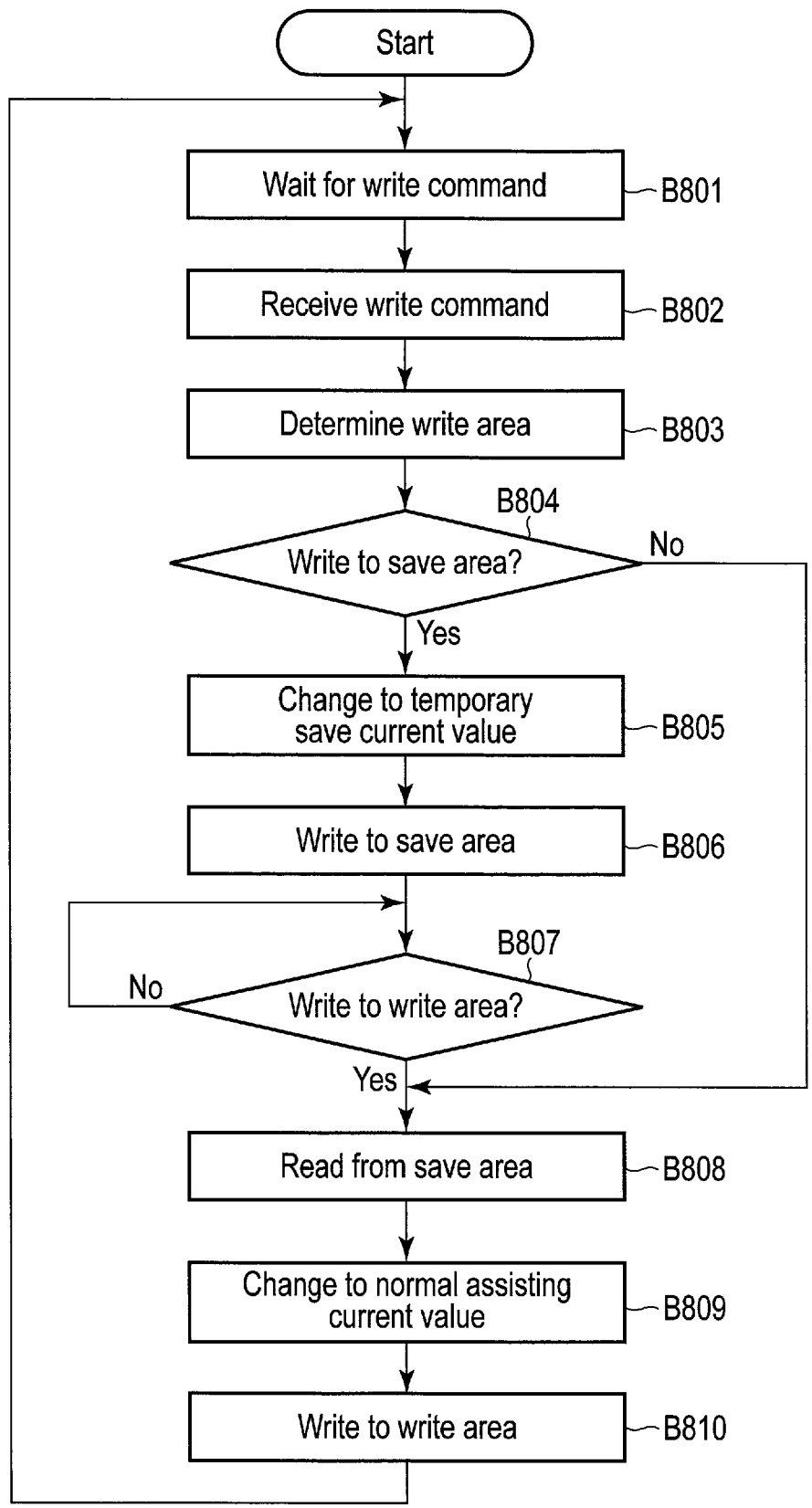
FIG. 8 is a flowchart showing an example of the write processing according to the first embodiment.

FIG. 8 is a flowchart showing an example of a write processing method according to the present embodiment.

The MPU 60 waits for a write command from the host 100 or the like (B801), and receives a write command from the host 100 or the like (B802). The MPU 60 determines a write area according to the write command received from the host 100 or the like (B803), and determines whether or not to temporarily write designated data to a save area, for example, the media cache 10b (B804). When the MPU 60 determines not to temporarily write the designated data to the save area (NO in B804), the MPU 60 proceeds to a process in B809. When the MPU 60 determines to temporarily write the designated data to the save area (YES in B804), the MPU 60 changes a normal energy value supplied to an assisting element to a temporary save energy value (B805), and temporarily writes the designated data to the save area, for example, the media cache 10b by supplying an element energy having the temporary save energy value to the assisting element (B806). For example, when the MPU 60 determines to temporary write the designated data to the save area, the MPU 60 changes a normal write current value or a normal write voltage value supplied to the STO 200 to a temporary save current value or a temporary save voltage value, and temporarily writes the designated data to the media cache 10b by supplying a temporary save current having the temporary save current value or a temporary save voltage having the temporary save voltage value to the STO 200.

The MPU 60 determines whether or not to write the data written in the save area to, for example, a predetermine area of the user data area 10a (B807). When the MUP 60 determines not to write the data written in the save area to the write area (NO in B807), the MPU 60 returns to (loops) the process in B807. When the MPU 60 determines to write the data written in the save area to the write area (YES in B807), the MPU 60 reads the data temporarily written in the save area (B808). The MPU 60 changes the temporary save energy value supplied to the assisting element to the normal energy value (B809), writes the designated data to the designated write area by supplying an element energy having the normal energy value to the assisting element (B810), and returns to the process in B801. For example, the MPU 60 changes the temporary save current value or the temporary save current voltage supplied to the STO 200 to the normal write current value or the normal write voltage value, and writes the designated data to the particular area of the user data area 10a by supplying a normal write current having the normal write current value or a normal write voltage having the normal write voltage value to the STO 200.

According to the present embodiment, the magnetic disk device 1 includes the assisting element, for example, the STO 200. In the temporary save processing, when temporarily writing the designated data to the save area, for example, the media cache 10b, the magnetic disk device 1 supplies the element energy having the temporary save energy value, for example, the assisting current having the temporary save current value or the assisting voltage having the temporary save voltage value to the assisting element, for example, the STO 200. In other words, the magnetic disk device 1 temporarily writes the designated data to the save area by supplying the element energy having the temporary save energy value to the assisting element. In addition, in the normal write processing, when writing the designated data to the write area, for example, the particular area of the user data area 10a, the magnetic disk device 1 supplies the element energy having the normal energy value, for example, the assisting current having the normal write current value or the assisting voltage having the normal write voltage value to the assisting element, for example, the STO 200. In other words, the magnetic disk device 1 writes the designated data to the write area by supplying the element energy having the normal energy value to the assisting element. In the temporary save processing, the magnetic disk device 1 supplies the element energy having the temporary save energy value less than the normal energy value to the assisting element, and as compared to the case of continuously supplying the element energy having the normal energy value to the assisting element, the magnetic disk device 1 can suppress degradation of the assisting element. In other words, the magnetic disk device 1 can improve the life of the assisting element. Therefore, the magnetic disk device 1 can improve reliability.

Next, magnetic disk devices according to other embodiments and other modifications will be described. In the other embodiments and the other modifications, parts identical to those of the above-described embodiment will be denoted by the same reference numbers, and detailed descriptions of them will be omitted.

(Modification 1)

A magnetic disk device 1 of a modification 1 differs from the magnetic disk device 1 of the first embodiment in including the disk 10 having a plurality of save areas.

Figure 9:
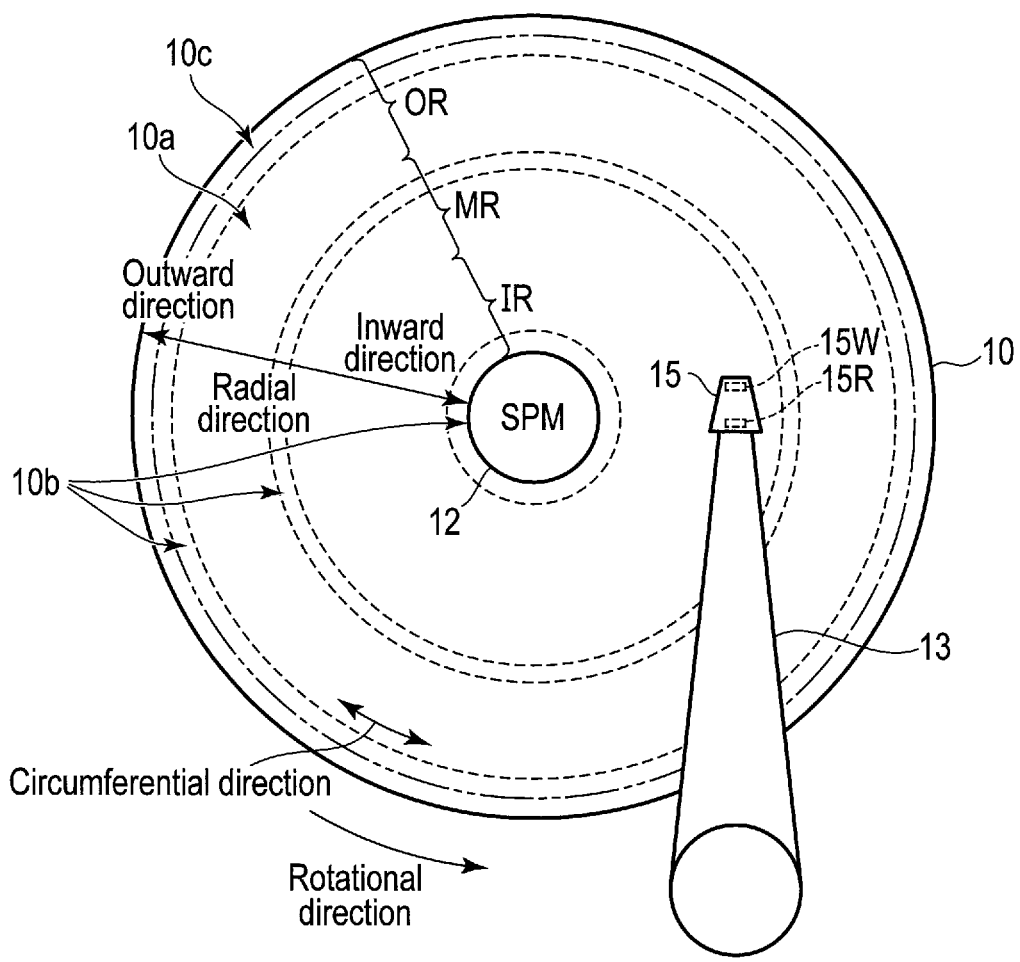
FIG. 9 is a schematic diagram showing an example of the arrangement of a head with respect to a disk according to a modification 1.

FIG. 9 is a schematic diagram showing an example of the arrangement of the head 15 with respect to the disk 10 according to the modification 1.

The disk 10 has a plurality of save areas, for example, media caches 10b. In the example shown in FIG. 9, one media cache 10b of the media caches 10b is located in the inner circumferential region IR. For example, one media cache 10b of the media caches 10b is located at the innermost circumference. Another media cache 10b of the media caches 10b is located in the middle circumferential region MR. Another media cache 10b of the media caches 10b is located in the outer circumferential region OR.

In the write processing, when temporarily writing data to the plurality of save areas, for example, the media caches 10b, the MPU 60 supplies the temporary save energy, for example, the temporary save current or the temporary save voltage to the assisting element, for example, the STO 200.

According to the modification 1, the magnetic disk device 1 can reduce the seek time in the write processing. Therefore, the magnetic disk device 1 can improve the performance of the write processing.

Second Embodiment

A magnetic disk device 1 of the second embodiment differs from the magnetic disk devices 1 of the first embodiment and the modification 1 in that the magnetic disk device 1 of the second embodiment can write data by thermally assisted magnetic recording (TAMR).

The magnetic disk device 1 corresponds to a magnetic disk device which can write data by thermally assisted magnetic recording.

Figure 10:
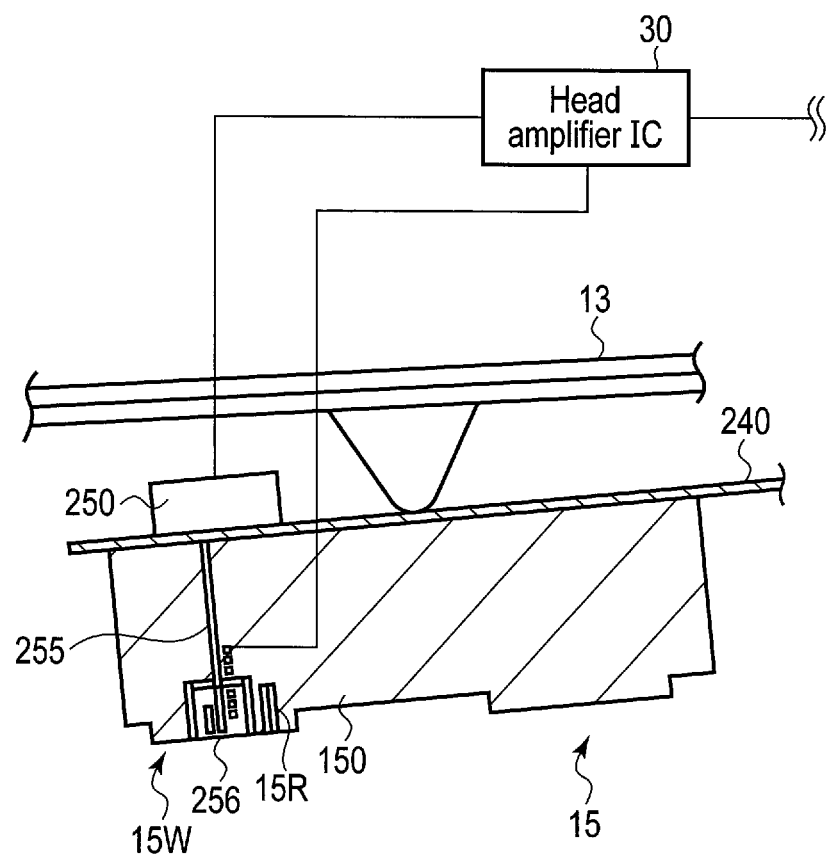
FIG. 10 is an enlarged cross-sectional view showing an example of a head according to the second embodiment.

FIG. 10 is an enlarged cross-sectional view showing an example of the head 15 according to the present embodiment.

In the example shown in FIG. 10, the head 15 includes the write head 15W, the read head 15R, a light-generating element (for example, a laser diode) 250, a waveguide 255, and a near-field light-emitting element (a plasmon generator or a near-field transducer) 256 which are disposed on the slider 150. The light-generating element 250 is a (laser) light source and is disposed on an upper part of the slider 150 or a gimbal 240. The light-generating element 250 supplies light to the waveguide 255 when an element energy, for example, a current, a voltage or the like is supplied from an element energy control circuit, for example, the head amplifier IC 30. Note that the light-generating element 250 may be disposed in a place other than the slider 150 or the gimbal 240. For example, the light-generating element 250 may be disposed outside the arm 13 and the head 15. The waveguide 255 propagates the light generated by the light-generating element 250 to the near-field light-emitting element 256.

The near-field light-emitting element 256 is disposed at a lower end of the slider 150 which faces the disk 10. The near-field light-emitting element 256 generates near-field light by the element energy generated in the light-generating element 250 and propagated through the waveguide 255, for example, laser light, and emits the near-field light to the disk 10. The emitted near-field light heats the recording layer of the disk 10 and reduces the coercivity of the recording layer of the disk 10. The near-field light-emitting element 256 includes a metal member. Note that, the near-field light-emitting element 256 may be replaced with a lens which focuses the light generated in the light-generating element 250 and propagated through the waveguide 255 on the disk 10. By emitting the near-field light from the near-field light-emitting element 256 to the disk 10 as described above, the magnetic disk device 1 can execute high-density magnetic recording on the disk 10 which is a high-coercivity medium. The configurations for executing thermally assisted recording, for example, the light-generating element (for example, the laser diode) 250, the waveguide 255, the near-field light-emitting element (the plasmon generator or the near-field transducer) 256 and the like will be hereinafter referred to also as assisting elements. The write processing of writing data by supplying a particular element energy, for example, a particular current or a particular voltage to an assisting element, for example, the light-generating element 150 or the write processing of writing data by supplying a particular element energy, for example, particular light to an assisting element, for example, the near-field light-emitting element 256 will be hereinafter referred to also as assisted recording or thermally assisted recording.

In addition, the near-field light-emitting element 256 defines the track width of the track written by the write head 15W (or the recording width) by the emission range (referred to also as the spot range or the heat distribution width) of the near-field light. That is, the track width corresponds to the width of the emission range of the near-field light. For example, when the near-field light-emitting element 256 emits the near-field light to the emission range with a width less than the width of the write head 15 W, the track width of the track written by the write head 15W may be less than the width of the write head 15W. In addition, when the near-field light-emitting element 256 emits the near-field light to the emission range with a width greater than the width of the write head 15W, the track width of the track written by the write head 15W may be greater than the width of the write head 15W. Therefore, if the near-field light-emitting element 256 is deformed by heat generated at the time of emitting the near-field light, etc., the emission range of the near-field light changes, and the track width of the track written by the write head 15W changes, accordingly. For example, when the element energy, for example, the current or the voltage supplied to the assisting element, for example, the light-generating element 250 is increased, the intensity of the near-field light emitted from the near-field light-emitting element 256 may be increased and the thermal assisting effect may be improved, but the emission range may be widened and the track width may be increased. In addition, for example, when the element energy, for example, the current or the voltage supplied to the assisting element, for example, the light-generating element 250 is reduced, the intensity of the near-field light emitted from the near-field light-emitting element 256 may be reduced and the thermal assisting effect may be degraded, but the emission range may be narrowed and the track width may be reduced. In other words, when the element energy, for example, the intensity of light supplied to the assisting element, for example, the near-field light-emitting element 256 is increased, the thermal assisting effect may be improved, but the emission range may be widened and the track width may be increased. In addition, when the element energy, for example, the intensity of light supplied to the assisting element, for example, the near-field light-emitting element 256 is reduced, the thermal assisting effect may be degraded, but the emission range may be narrowed and the track width may be reduced.

The element energy control circuit 320 is electrically connected to the assisting element, for example, the light-generating element 250, and supplies the particular element energy, for example, the particular current or the particular voltage to the assisting element, for example, the light-generating element 250 according to the control of the system controller 130, for example, the MPU 60. In other words, the element energy control circuit 320 is connected to the assisting element, for example, the near-field light-emitting element 256, and supplies the particular element energy, for example, the particular light to the assisting element, for example, the near-field light-emitting element 256 according to the control of the system controller 130, for example, the MPU 60.

The energy controller 620 controls and adjusts the recording current supplied (or applied) to the recording coil 180 and the element energy, for example, the current or the voltage supplied (or applied) to the assisting element, for example, the light-generating element 250. In other words, the energy controller 620 controls and adjusts the recording current supplied (or applied) to the recording coil 180 and the element energy, for example, the light supplied (or applied) to the assisting element, for example, the near-field light-emitting element 256.

In the write processing, the energy controller 620 changes the element energy, for example, the current or the voltage supplied to the assisting element, for example, the light-generating element 250 via the element energy control circuit 320. In other words, in the write processing, the energy controller 620 changes the element energy, for example, the light supplied to the assisting element, for example, the near-field light-emitting element 256 via the element energy control circuit 320.

In the write processing, the energy controller 620 sets the element energy, for example, the current or the voltage supplied to the assisting element, for example, the light-generating element 250 in the temporary save processing and the element energy, for example, the current or the voltage supplied to the assisting element, for example, the light-generating element 250 in the normal write processing to different values. In other words, the energy controller 620 sets the element energy, for example, the light supplied to the assisting element, for example, the near-field light-emitting element 256 in the temporary save processing, and the element energy, for example, the light supplied to the element energy, for example, the near-field light-emitting element 256 in the normal write processing to different values. The "light supplied to the assisting element in the temporary save processing" will be referred to also as "temporary save light". The "light supplied to the assisting element in the normal write processing" will be referred to also as "normal light". Note that the "temporary save energy" includes the "temporary save light". The "normal energy" includes the "normal light". The "temporary save current" includes the "current supplied to the light-generating element 250 in the temporary save processing". The "temporary save voltage" includes the "voltage supplied to the light-generating element 250 in the temporary save processing". The "normal write current" includes the "current supplied to the light-generating element 250 in the normal write processing". The "normal write voltage" includes the "voltage supplied to the light-generating element 250 in the normal write processing".

For example, the energy controller 620 writes data to the save area (executes assisted recording) by supplying the temporary save current having the temporary save current value less than the normal write current value or the temporary save voltage having the temporary save voltage value less the normal write voltage value to the light-generating element 250. For example, the energy controller 620 writes data to the save area (executes assisted recording) by supplying the normal write current having the normal write current value greater than the temporary save current value or the normal write voltage having the normal write voltage value greater than the temporary save voltage value to the light-generating element 250. In the second embodiment, in the write processing, the energy controller 620 sets the temporary save energy value, for example, the temporary save current value or the temporary save voltage value to a value greater than 0.

In the write processing, the energy controller 620 sets the temporary save energy value, for example, the intensity of the temporary save light (hereinafter referred to also as a temporary save intensity) supplied to the assisting element, for example, the near-field light-emitting element 256 to less than the normal energy value, for example, the intensity of the normal light (hereinafter referred to also as a normal intensity). In other words, the energy controller 620 writes data to the save area (executes assisted recording) by supplying the temporary save light having the temporary save intensity less than the normal intensity to the near-field light emitting element 256. In the write processing, the energy controller 620 sets the normal energy value, for example, the normal intensity to greater than the temporary save energy value, for example, the temporary save intensity. In other words, the energy controller 620 writes data to the write area (executes assisted recording) by supplying the normal light having the normal intensity greater than the temporary save intensity to the near-field light-emitting element 256. In the second embodiment, in the write processing, the energy controller 620 sets the temporary save energy value, for example, the temporary save intensity to a value greater than 0.

According to the second embodiment, the magnetic disk device 1 includes the assisting element, for example, the light-emitting element 150 and the near-field light-emitting element 256. In the temporary save processing, when temporarily writing the designated data to the save area, for example, the media cache 10*b*, the magnetic disk device 1 supplies the element energy having the temporary save energy value, for example, the current having the temporary save current value or the voltage having the temporary save voltage value to the assisting element, for example, the light-generating element 250. In other words, in the temporary save processing, when temporary writing the designated data to the save area, for example, the media cache 10*b*, the magnetic disk device 1 supplies the element energy having the temporary save energy value, for example, the light having the temporary save intensity to the assisting element, for example, the near-field light-emitting element 256.

In addition, in the normal write processing, when writing the designated data to the write area, for example, the particular area of the user data area 10*a*, the magnetic disk device 1 supplies the element energy having the normal energy value, for example, the current having the normal write current value or the voltage having the normal write voltage value to the assisting element, for example, the light-generating element 250. In other words, in the normal write processing, when writing the designated data to the write area, for example, the particular area of the user data area 10*a*, the magnetic disk device 1 supplies the element energy having the normal energy value, for example, the light having the normal intensity to the assisting element, for example, the near-field light-emitting element 256.

The magnetic disk device 1 supplies the element energy having the temporary save energy value less than the normal energy value to the assisting element in the temporary save processing, and as compared to the case of continuously supplying the element energy having the normal energy value to the assisting element, the magnetic disk device 1 can suppress degradation of the assisting element. In other words, the magnetic disk device 1 can improve the life of the assisting element. Therefore, the magnetic disk device 1 can improve reliability.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a disk having a first area which is usable by a user and where data is recorded at a first track recording density, and a second area which is a cache area where data is temporarily recorded before the data is recorded in the first area and where data is recorded at a second track recording density less than the first track recording density;
   a head including a write head which writes data to the disk, and an assisting element which generates energy which improves write performance of the write head; and
   a controller which writes data to the first area by supplying energy having a first value to the assisting element, and writes data to the second area by supplying energy having a second value less than the first value to the assisting element, wherein
   when the controller determines to write data to the second area, the controller temporary writes first data to the second area, and reads the first data from the second area and writes the first data to the first area, and
   when the controller determines not to write data to the second area, the controller writes the first data to the first area.

2. The magnetic disk device of claim 1, wherein the assisting element is a spin torque oscillator which generates a high-frequency magnetic field on the disk.

3. The magnetic disk device of claim 2, wherein the first value and the second value are currents or voltages.

4. The magnetic disk device of claim 2, wherein the second value is 0.

5. The magnetic disk device of claim 1, wherein the assisting element is a near-field light-emitting element which emits near-field light to the disk.

6. The magnetic disk device of claim 5, wherein the first value and the second value are intensities of light.

7. The magnetic disk device of claim 6, wherein the second value is greater than 0.

8. A write processing method applied to a magnetic disk device comprising: a disk having a first area which is usable by a user and where data is recorded at a first track recording density, and a second area which is a cache area where data is temporarily recorded before the data is recorded in the first area and where data is recorded at a second track recording density less than the first track recording density; and a head including a write head which writes data to the disk, and an assisting element which generates energy which improves write performance of the write head, the method comprising:
   writing data to the first area by supplying energy having a first value to the assisting element;
   writing data to the second area by supplying energy having a second value less than the first value to the assisting element;
   writing temporary first data to the second area, reading the first data from the second area, and writing the first data to the first area when the controller determines to write data to the second area; and
   writing the first data to the first area when the controller determines not to write data to the second area.

9. The write processing method of claim 8, wherein the assisting element is a spin torque oscillator which generates a high-frequency magnetic field on the disk.

10. The write processing method of claim 9, wherein the first value and the second value are currents or voltages.

11. The write processing method of claim 9, wherein the second value is 0.

12. The write processing method of claim 8, wherein the assisting element is a near-field light-emitting element which emits near-field light to the disk.

13. The write processing method of claim 12, wherein the first value and the second value are intensities of light.

* * * * *